(12) United States Patent
Mulder

(10) Patent No.: US 7,490,532 B2
(45) Date of Patent: Feb. 17, 2009

(54) ROTATABLY ADJUSTABLE APPARATUS FOR LOCATING A WORKPIECE

(75) Inventor: Douglas A. Mulder, Clinton Township, MI (US)

(73) Assignee: Norgren Automotive, Inc., Clinton Township, MI (US)

( * ) Notice: Subject to any disclaimer, the term of this patent is extended or adjusted under 35 U.S.C. 154(b) by 622 days.

(21) Appl. No.: 10/858,108

(22) Filed: Jun. 1, 2004

(65) Prior Publication Data

US 2004/0239025 A1 Dec. 2, 2004

Related U.S. Application Data

(60) Provisional application No. 60/475,101, filed on Jun. 2, 2003.

(51) Int. Cl.
*B23B 29/24* (2006.01)

(52) U.S. Cl. .................... 74/813 L; 269/32

(58) Field of Classification Search .......... 74/813 R, 74/815, 816, 813 L; 269/32, 64, 49
See application file for complete search history.

(56) References Cited

U.S. PATENT DOCUMENTS

| | | | |
|---|---|---|---|
| 4,111,100 A | 9/1978 | Boyer | |
| 4,119,017 A | 10/1978 | Nusbaumer et al. | |
| 4,736,675 A | 4/1988 | Stoll | |
| 5,813,699 A * | 9/1998 | Donner et al. | 280/775 |
| 5,974,948 A * | 11/1999 | Thompson et al. | 92/165 PR |
| 6,502,880 B1 | 1/2003 | Sawdon | |
| 6,695,359 B2 * | 2/2004 | Morel et al. | 269/49 |
| 6,756,707 B2 * | 6/2004 | Hochhalter et al. | 310/20 |
| 7,029,000 B2 * | 4/2006 | Petit et al. | 269/47 |
| 7,156,385 B2 * | 1/2007 | Mulder | 269/32 |
| 2003/0234478 A1 * | 12/2003 | Steele et al. | 269/25 |

FOREIGN PATENT DOCUMENTS

| | | |
|---|---|---|
| EP | 1 123 779 A1 | 8/2001 |
| FR | 2 755 049 A1 | 4/1998 |
| WO | WO 01/78942 A1 | 10/2001 |

* cited by examiner

*Primary Examiner*—Richard W L Ridley
*Assistant Examiner*—Matthew Johnson
(74) *Attorney, Agent, or Firm*—Young Basile

(57) ABSTRACT

A rotatably adjustable apparatus for locating geometric references on a workpiece. The present invention provides a housing having a linear actuator for actuating a locating member between an extended position, wherein the locating member engages the workpiece, and a retracted position, wherein the locating member disengages the workpiece. A substantially cylindrical locking member is connected to the locating member and is disposed within the housing. A releasable striker connected to and accessible from outside the housing matingly engages the locking member in a predetermined angular position to provide angular adjustment to the locating member. A sensing device is connected to the housing and senses the position of the locating member.

17 Claims, 3 Drawing Sheets

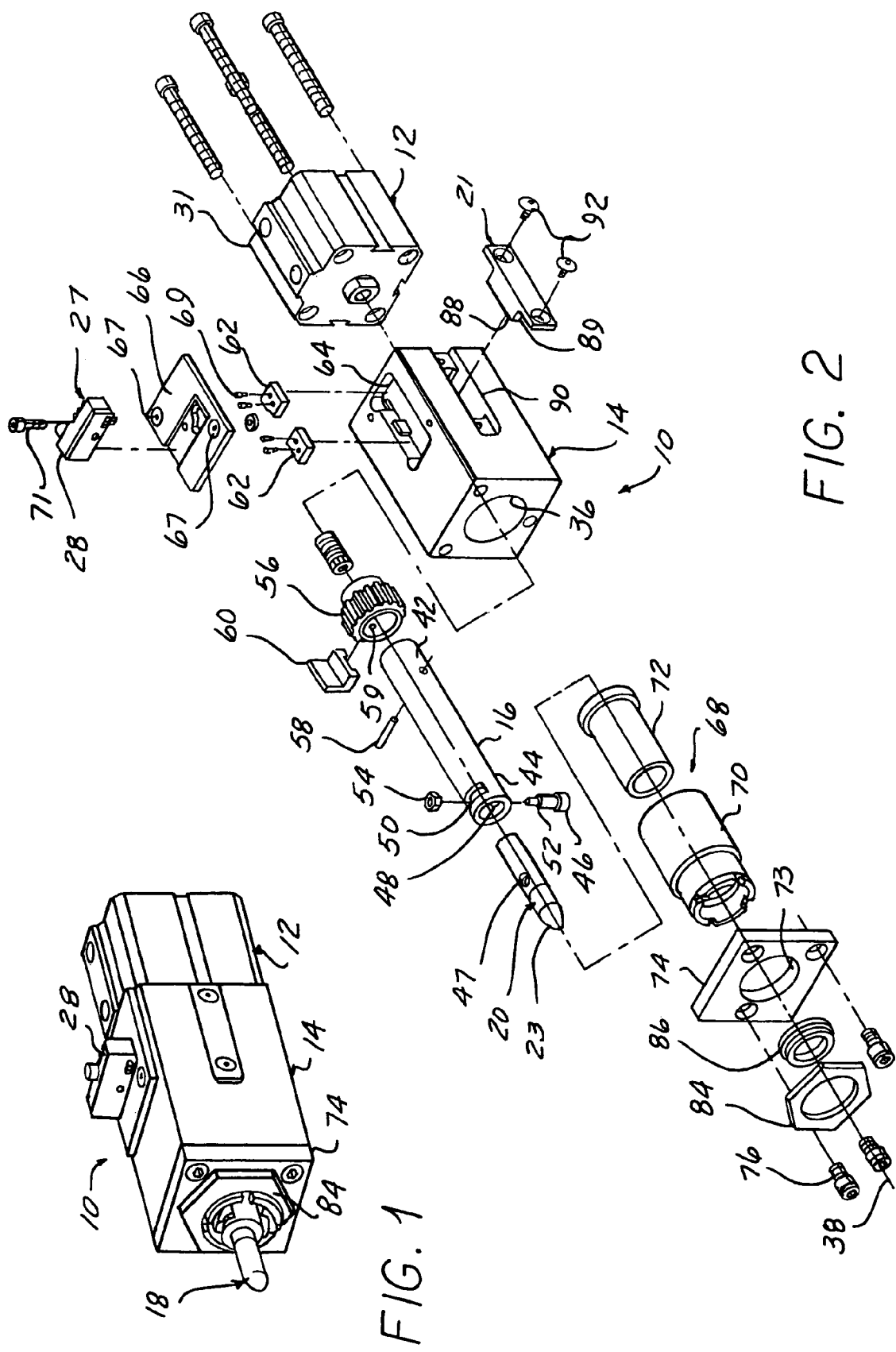

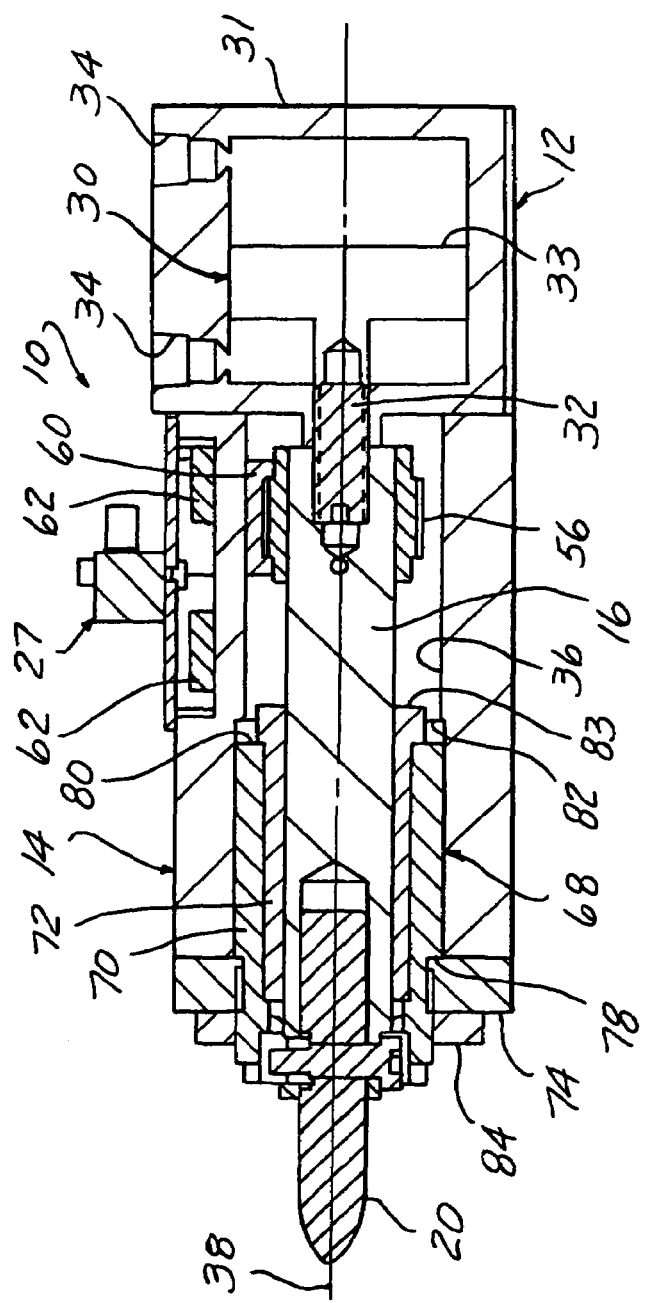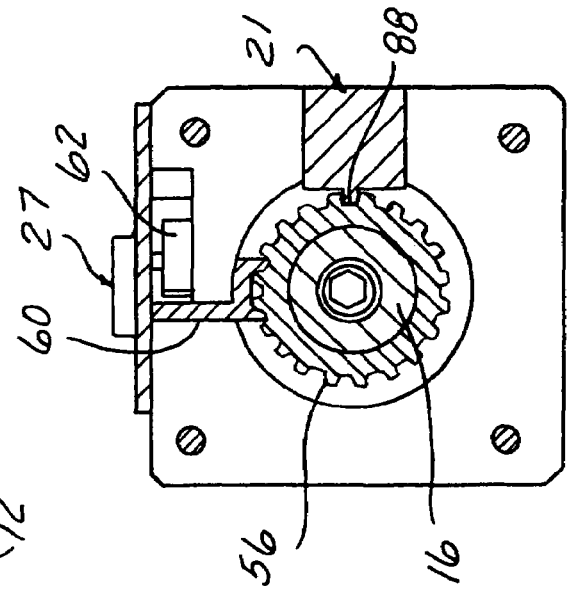
FIG 3
FIG. 5

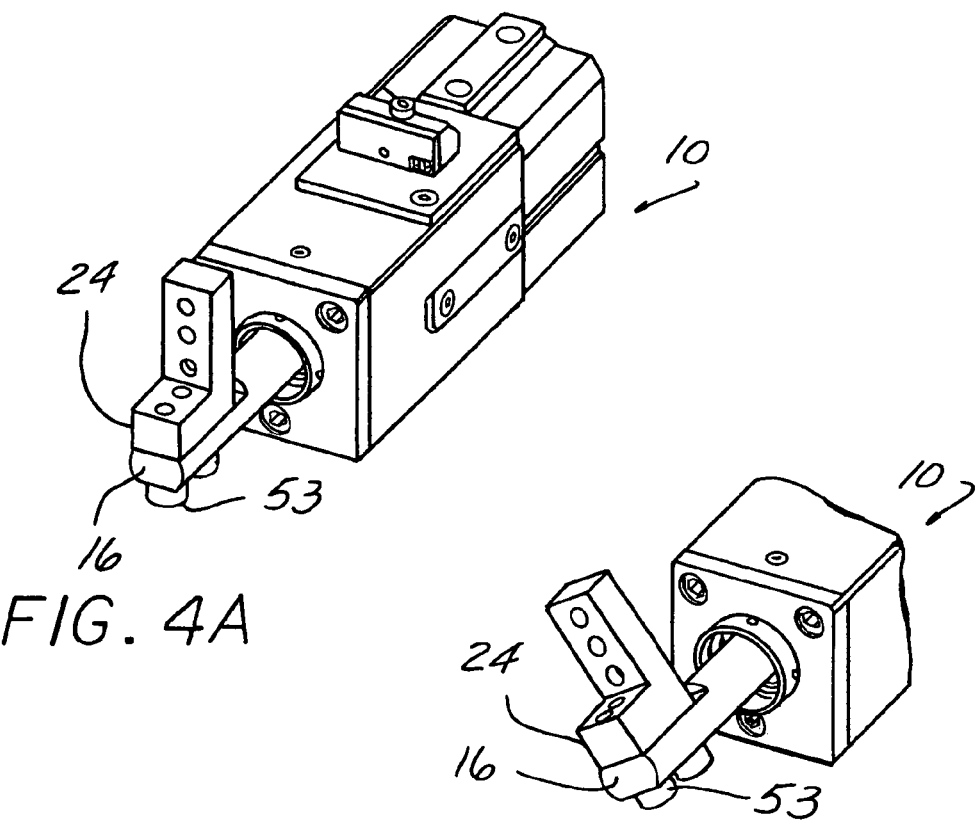
FIG. 4A
FIG. 4B
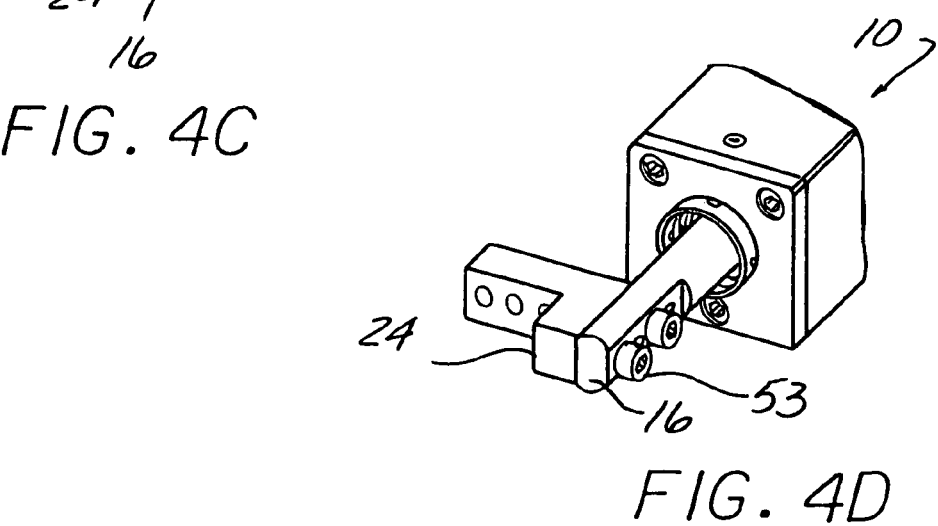
FIG. 4C
FIG. 4D

ROTATABLY ADJUSTABLE APPARATUS FOR LOCATING A WORKPIECE

This application claims the benefit of U.S. Provisional Application No. 60/475,101, filed Jun. 2, 2003.

FIELD OF THE INVENTION

The present invention relates to an apparatus for locating a workpiece, and more particularly, a locating device that provides rotational adjustment of a locating member to properly locate geometric references on a workpiece.

BACKGROUND OF THE INVENTION

It is well known within the manufacturing industry to locate various geometric references on a workpiece through the use of a retractable locating member. Such locating members are typically actuated reciprocally between an extended position, wherein the locating member moves axially to engage the workpiece, and a retracted position, wherein the locating member moves axially to disengage the workpiece. Various types of locating members may be utilized depending on the geometric references to be located. For instance, locating pins having a cylindrical geometry are ideally suited for engaging locating holes within sheet metal parts, while L-blocks may be utilized to locate a surface or an edge of a sheet metal workpiece. This is done by attaching an L-block to the locating pin or an output shaft by which the locating pin is connected thereto.

Fine adjustment of the locating member is sometimes required to properly locate the workpiece. When the locating member is a cylindrical member, rotational adjustment is not required since the locating pin is typically symmetrical, and therefore, rotating the locating pin will not affect the position of the locating pin. However, L-blocks typically extend radially outward from a longitudinal axis of the locating pin and are not typically symmetrical. In order to rotatably adjust the L-block, the entire body or housing of the locating device must be rotated to the desired angular position. This is an inefficient process since locating devices are typically connected to a support structure, thereby requiring the support structure to be adjusted with the locating device. This, of course, requires a substantial amount of time, which is inefficient in an industrial environment.

It would be desirable to provide a rotational adjustment to a locating device that was quick, simple, and accurate.

SUMMARY OF THE INVENTION

The present invention relates to a rotatably adjustable apparatus for locating a workpiece. The present invention provides a housing having a linear actuator for actuating a locating member between an extended position, wherein the locating member is engageable with the workpiece, and a retracted position, wherein the locating member is not engageable with the workpiece. The locating member includes a locking member engageable with a striker wherein the striker engages the locking member to adjustably maintain the locating member in a predetermined angular position. The locating member may also include an L-block for engaging the workpiece. A sensing device is connected to the housing for sensing the position of the locating member.

BRIEF DESCRIPTION OF THE DRAWINGS

The description herein makes reference to the accompanying drawings wherein like referenced numerals refer to like parts throughout several views and wherein:

FIG. 1 is a perspective view of the rotatably adjustable apparatus of the present invention.

FIG. 2 is an exploded view of the rotatably adjustable apparatus of the present invention.

FIG. 3 is a sectional view of the rotatably adjustable apparatus of the present invention.

FIGS. 4A-4D are several perspective views showing various rotatable positions of the rotatably adjustable apparatus of the present invention.

FIG. 5 is a sectional view showing the locking member and the striker of the rotatably adjustable apparatus of the present invention.

DESCRIPTION OF THE PREFERRED EMBODIMENT

Referring to the drawings, the present invention will now be described in detail with reference to the disclosed embodiments.

FIGS. 1-5 illustrate a rotatably adjustable apparatus 10 for locating various geometric references on a workpiece (not shown), such as apertures, surfaces, and edges of the workpiece. The rotatably adjustable apparatus 10 includes a linear actuator 12 connected to a body or a housing 14. The housing 14 slidably supports a locating member 18 for reciprocal movement along a longitudinal axis 38 of the housing 14 between a retracted position, wherein the locating member 18 does not engage the workpiece, and an extended position, wherein the locating member 18 engages the workpiece. At least a portion of the locating member 18 remains slidably disposed within the housing 14 in both the extended and retracted positions. The locating member 18 includes an output shaft 16 that is connected to the linear actuator 12 at one end of the output shaft 16, and a locating pin 20 that is connected to an opposite end of the output shaft 16. The locating pin 20 may comprise various structures, such as a cylindrical member 23 or an L-block 24. A striker 21 is releasably connected to the housing 14 and adjustably engages and maintains the locating member 18 in a predetermined angular position. The apparatus 10 of the present invention may also provide a sensing device 27 connected to the housing 14 for determining the position of the locating member 18.

To reciprocally actuate the locating member 18 between the extended position and the retracted position, the linear actuator 12 is connected to the housing 14 and may be pneumatically actuated. As seen in FIGS. 1-3, the linear actuator 12 houses a piston 30 that is slidably disposed within a housing 31 of the linear actuator 12. The piston 30 includes a piston rod 32 connected to a piston head 33 wherein the piston rod 32 extends outwardly from the housing 31 of the linear actuator 12 and into the housing 14 of the apparatus 10. A pair of passageways 34 extend into the housing 31 of the linear actuator 12 to communicate pressurized air from a pressurized air source (not shown) to both sides of the piston head 33. The introduction of pressurized air onto either side of the piston head 33 while exhausting air from the opposite side of the piston head 33 allows for reciprocal movement of the piston 30 between the extended position and the retracted position. Although the linear actuator 12 is ideally suited for pneumatic actuation, the linear actuator 12 may utilize other forms of fluid actuation, such as hydraulics.

The housing 14 of the rotatably adjustable apparatus 10 has a substantially rectangular structure having a substantially cylindrical throughbore 36 extending along the longitudinal axis 38 of the housing 14. The output shaft 16 of the locating member 18 is slidably disposed within the bore 36 of the housing 14 and has a first end 42 connected to the piston rod 32 of the linear actuator 12 and a second or opposite end 44 extending toward the open end of the housing 14. The locating pin 20 is connected to the second end 44 of the output shaft 16 through various means. When utilizing the cylindrical member 23 as a locating pin 20, the cylindrical member 23 may be connected to the output shaft 16 through the use of a threaded fastener 46. The cylindrical member 23 provides an aperture 47 extending therethrough which correspondingly aligns with an aperture 48 and a slot 50 provided in the second end 44 of the output shaft 16. The fastener 46 provides a screw 52 which extends through the aperture 48 and slot 50 of the output shaft 16, as well as the aperture 47 in the cylindrical member 23. A threaded nut 54 threads onto the screw 52 to secure the cylindrical member 23 to the output shaft 16. When the L-block 24 is utilized as the locating pin 20, threaded fasteners 53 may be utilized to secure the L-block 24 to the output shaft 16, as seen in FIGS. 4A-4D.

To sense the position of the locating member 18, a splined cylinder 56 is connected to and overlies the first end 42 of the output shaft 16 in a coaxial manner, as seen in FIGS. 2-5. The splined cylinder 56 is connected to the output shaft 16 through the use of a pin 58 which extends through corresponding apertures 59 in the splined cylinder 56 and the output shaft 16. A substantially L-shaped tracking block 60 longitudinally engages the splined cylinder 56 by extending over the ends of the splined cylinder 56. However, the tracking block 60 does not engage the splines of the splined cylinder 56. This allows the tracking block 60 to travel with the output shaft 16 along the longitudinal axis 38 of the housing 14 when moving between the extended position and the retracted position. A pair of proximity switches or sensors 62 are mounted in a recess 64 provided in the housing 14 for sensing the position of the tracking block 60. The sensors 62 are secured to the housing 14 by fasteners 69. The recess 64 and the sensors 62 are covered by a plate 66 which is secured to the housing 14 of the apparatus 10 by fasteners 67. The electronic terminal 28 is secured to the cover plate 66 of the housing 14 by a fastener 71. The electronic terminal 28 extends through an aperture provided in the cover plate 66 of the housing 14 and is electronically coupled to the sensors 62 to provide an electronic signal to a controller (not shown) which interprets the signal to indicate the position of the locating member 18.

In order to slidably support the locating member 18 within the housing 14 of the rotatably adjustable apparatus 10, a bearing assembly 68 is provided within the bore 36 of the housing 14, as seen in FIGS. 2-3. The bearing assembly 68 provides an outer, substantially cylindrical portion 70 that is press-fit to an inner, substantially cylindrical portion 72. The inner portion 72 slidably receives and supports the output shaft 16 along the inner diameter of the inner portion 72 of the bearing assembly 68. The outer portion 70 of the bearing assembly 68 provides an external threaded portion which is threadably connected to a threaded aperture 73 provided in an end block 74. The end block 74 is substantially rectangular and is connected to the end of the housing 14 by three threaded fasteners 76. The outer portion 70 of the bearing assembly 68 may be threaded in and out of the threaded aperture of the end block 74 along the longitudinal axis 38 of the housing 14 to adjust the length of stroke of the locating member 18. The stroke adjustment is limited by a pair of shoulders 78, 80 provided on the outer diameter of the outer portion 70 of the bearing assembly 68. The first shoulder 78 engages an inner surface of the end block 74 to limit the outwardly adjustment of the bearing assembly 68 toward the extended position. The second shoulder 80 of the outer portion 70 may engage a shoulder 82 formed in the wall of the housing 14 that defines the bore 36 thereby limiting the stroke adjustment of the bearing assembly 68 toward the retracted position. In another embodiment, the bore 36 is a constant diameter, and thus, the shoulder 82 does not exist. This allows shoulder 83 of the inner portion 72 of the bearing assembly 68 to abut an end wall 89 of a key 88 to limit the stroke adjustment toward the retracted position. In both embodiments, a hexagonal jam nut 84 is threaded to the threaded portion of the outer portion 70 of the bearing assembly 68 adjacent the end block 74 to secure the bearing assembly 68 in a fixed position. A seal 86 is provided between the output shaft 16 and the inner diameter of the outer portion 70 of the bearing assembly 68 to prevent any contamination from entering the apparatus 10.

To rotatably adjust the locating member 18, the striker 21 provides a splined key 88 which matingly engages the splined cylinder 56 on the output shaft 16 of the locating member 18 to prevent the output shaft 16 and the locating pin 20 from rotating, as seen in FIGS. 2 and 5. The key 88 extends along the longitudinal axis 38 of the housing 14 so that the splined cylinder 56 continuously engages the key 88 when the locating member 18 is moving between the extended position and the retracted position along the longitudinal axis 38 of the housing. The striker 21 is mounted within a slot or aperture 90 provided in a wall of the housing 14 of the apparatus 10 and is releasably secured to the housing 14 by a pair of threaded fasteners 92. The fasteners 92 are accessible from outside the housing 14 so that the striker 21 may be disengaged from the splined cylinder 56 to allow for rotational adjustment of the locating member 18, as seen in FIG. 5.

In operation, the appropriate locating pin 20 is connected to the output shaft 16 of the locating member 18 of the apparatus 10. The geometric reference of the workpiece to be located is identified, and the appropriate rotational adjustment is determined. The fasteners 92 on the striker 21 are unthreaded, and the key 88 on the striker 21 is withdrawn from engagement with the splined cylinder 56. The locating member 18 is rotated to a predetermined angular position, and the striker 21 is inserted back into the slot 90 of the housing 14 to engage the splined cylinder 56. Fasteners 92 are threaded and tightened to secure the striker,21 within the housing 14. The rotatably adjustable locating apparatus 10 may then be reciprocally actuated along the longitudinal axis 38 of the housing 14 between the extended position and the retracted position while maintaining the locating pin 20 in a predetermined angular orientation.

While the invention has been described in connection with what is presently considered to be the most practical and preferred embodiment, it is to be understood that the invention is not to be limited to the disclosed embodiments, but, to the contrary, it is intended to cover various modifications or equivalent arrangements included within the spirit and scope of the appended claims. The scope is to be accorded the broadest interpretation so as to encompass all such modifications and equivalent structures as is performed under the law.

What is claimed is:

1. A rotatably adjustable apparatus for locating a workpiece, comprising:
   a housing having a longitudinal through bore, an aperture extending through said housing substantially transverse to said longitudinal through bore from an outer periphery of said housing to said longitudinal through bore;
   a locating member at least partially disposed within said housing for movement between an extended position, wherein said locating member is engageable with said workpiece, and a retracted position, wherein said locating member is not engageable with said workpiece; and a striker releasably disposed within said aperture and releasably connected to said housing for adjustably engaging and maintaining said locating member in a predetermined angular position.

2. The apparatus stated in claim 1, further comprising:

a linear actuator connected to said housing and coupled to said locating member for actuating said locating member between said extended position and said retracted position.

3. The apparatus stated in claim 1, further comprising:

said locating member having a locking member for engagement with said striker.

4. The apparatus stated in claim 1, further comprising:

said locating member having an L-block engageable with said workpiece.

5. The apparatus stated in claim 1, further comprising:

a sensing device connected to said housing for sensing the position of said locating member.

6. A rotatably adjustable apparatus for locating a workpiece, comprising:

a housing having a longitudinal through bore, an aperture extending through said housing substantially transverse to said longitudinal through bore from an outer periphery of said housing to said longitudinal through bore, and a linear actuator connected to said housing;

a locating member at least partially disposed within said housing and connected to said linear actuator for movement between an extended position, wherein said locating member is engageable with said workpiece, and a retracted position, wherein said locating member is not engageable with said workpiece;

a locking member connected to said locating member; and a striker releasably disposed within said aperture and releasably connected to said housing and cooperatively engaging said locking member for adjustably maintaining said locating member in a predetermined angular position.

7. The apparatus stated in claim 6, wherein said locating member further comprises:

an output shaft connected to said linear actuator and slidably supported within said housing; and a locating pin connected to said output shaft and extending outward from said housing when in the extended position.

8. The apparatus stated in claim 7, wherein said locating pin further comprises:

an L-block engageable with said workpiece.

9. The apparatus stated in claim 6, further comprising:

said locking member having a spline formed thereon; and said striker having a key formed thereon for matingly engaging said spline on said locking member and prohibiting said locking member from rotating while allowing said locking member to move along a longitudinal axis of said locking member.

10. The apparatus stated in claim 6, further comprising:

a sensing device connected to said housing for sensing the position of said locking member.

11. The apparatus stated in claim 10, said sensing device further comprising:

a tracking block coupled to said locating member and moving with said locating member between said extended position and said retracted position; and at least one sensor for sensing the position of said tracking block.

12. A rotatably adjustable apparatus for locating a workpiece, comprising:

a housing having a longitudinal bore extending there through, an aperture extending through said housing substantially transverse to said longitudinal bore from an outer periphery of said housing to said longitudinal bore, and a linear actuator connected to said housing;

an output shaft connected to said linear actuator and slidably disposed within said bore of said housing;

a locating pin connected to said output shaft wherein said locating pin is reciprocally actuated between an extended position, wherein said locating pin is engageable with said workpiece, and a retracted position, wherein said locating pin is not engageable with said workpiece;

a locking member connected to said output shaft and disposed within said housing; and a striker releasably disposed within said aperture and releasably connected to said housing and cooperatively engaging said locking member for adjustably maintaining said locking member in a predetermined angular position.

13. The apparatus stated in claim 12, wherein said locating pin further comprises:

an L-block engageable with said workpiece.

14. The apparatus stated in claim 12, further comprising:

said locking member having a substantially cylindrical sleeve having a spline formed thereon; and said striker having a key formed thereon for matingly engaging said spline and prohibiting said output shaft and locating pin from rotating.

15. The apparatus stated in claim 12, further comprising: a sensing device connected to said housing for sensing the position of said locating member.

16. The apparatus stated in claim 15, wherein said sensor further comprises:

a tracking block connected to said locating member and moving with said locating member between said extended position and said retracted position;

at least one proximity switch for sensing the position of said tracking block; and an electronic terminal in electronic communication with said proximity switches for providing an electronic signal regarding the position of said tracking block.

17. The apparatus stated in claim 12, further comprising:

said housing having a longitudinal axis coaxial with said longitudinal bore; and said linear actuator actuating said locating pin along said longitudinal axis between said extended position and said retracted position.

* * * * *

UNITED STATES PATENT AND TRADEMARK OFFICE
CERTIFICATE OF CORRECTION

| | | |
|---|---|---|
| PATENT NO. | : 7,490,532 B2 | Page 1 of 1 |
| APPLICATION NO. | : 10/858108 | |
| DATED | : February 17, 2009 | |
| INVENTOR(S) | : Douglas A. Mulder | |

It is certified that error appears in the above-identified patent and that said Letters Patent is hereby corrected as shown below:

In Col. 4, Line 4, delete "allows" and insert -- allows the --; and

In Col. 4, Line 41, delete "striker,21" and insert -- striker 21 --.

Signed and Sealed this

Thirty-first Day of March, 2009

JOHN DOLL
*Acting Director of the United States Patent and Trademark Office*